Patented Oct. 28, 1924.

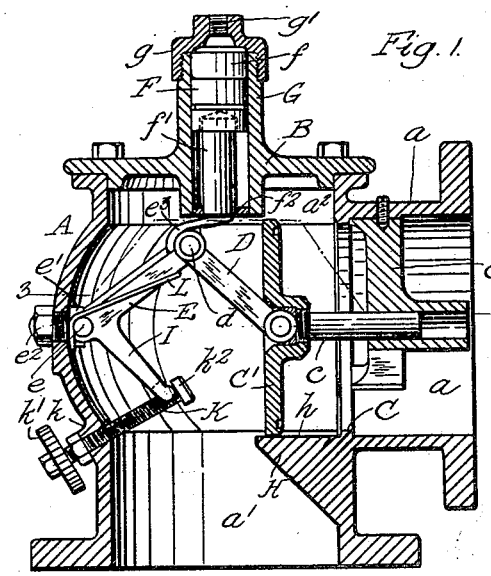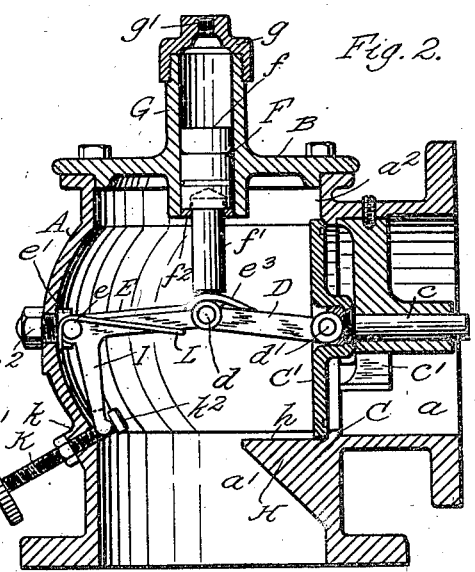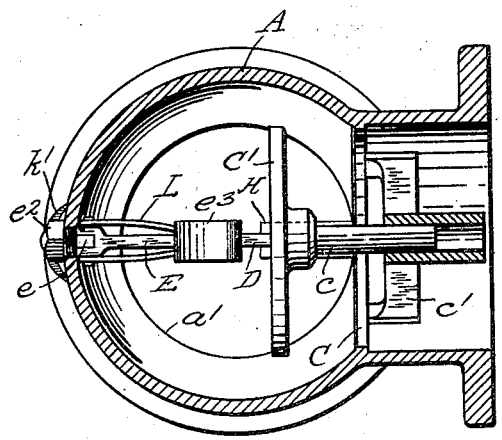

1,513,424

UNITED STATES PATENT OFFICE.

GEORGE M. RICHARDS, OF CHESTNUT HILL, PENNSYLVANIA.

UNLOADER VALVE.

Application filed July 14, 1920. Serial No. 396,179.

*To all whom it may concern:*

Be it known that I, GEORGE M. RICHARDS, a citizen of the United States, residing at Chestnut Hill, in the county of Philadelphia and State of Pennsylvania, have invented a new and useful Improvement in Unloader Valves, of which the following is a specification.

This invention relates more particularly to unloader valves for air or gas compressors, pumps, or the like.

The objects of the invention are to provide a valve of this kind which requires comparatively little power to press the valve tightly on its seat; also to provide a valve of this kind which may be closed either by automatically controlled means or by hand; also to improve the construction of valves of this kind in other respects hereinafter specified.

In the accompanying drawings:—

Fig. 1 is a central sectional elevation of an unloader valve embodying the invention, showing the valve open.

Fig. 2 is a similar view thereof, showing the valve closed.

Fig. 3 is a sectional plan view thereof on line 3—3, Fig. 1.

The invention is shown in the accompanying drawings as applied to a suction unloader, adapted to unload an air or gas compressor, but it is not intended to limit the invention to such use since it will be seen that the invention can readily be applied to valves used for other purposes.

A represents a housing or casing on which the parts of the unloader valve are arranged and which includes inlet and outlet passages or openings $a$ and $a'$. The valve housing is provided with an opening $a^2$ through which access may be had to the valve and which is covered by means of a cap or part B. The valve housing is provided adjacent to the inlet passage $a$ with an annular valve seat C with which a valve C' is adapted to cooperate. This valve may be guided in its movement toward and from its seat by any suitable means, the valve shown being provided with a guide stem $c$ which is slidably arranged in a spider $c'$ suitably secured in the inlet passage $a$ of the valve housing. All of these parts may be of any suitable or usual construction and of themselves constitute no part of this invention.

In order to effect the closing of the valve, a toggle mechanism is preferably employed which connects the valve with an oppositely disposed portion of the valve housing. This toggle mechanism in the construction shown, consists of a pair of links D and E, the adjacent ends of which are connected by means of a pivot $d$. The link D is also pivotally secured to the valve C'. The link E is pivoted at $e$ on a plug or part $e'$ suitably secured to the housing A, the nut $e^2$ being used to secure the plug in place on the housing. One of the links, for example, the link E is preferably provided with a cam-faced projecting portion $e^3$ to which pressure may be applied to actuate the toggle mechanism for operating the valve. A toggle mechanism of other construction may be employed if desired.

Any suitable means may be employed for actuating the toggle mechanism for opening and closing the valve. In the construction shown the valve is adapted to be closed by means of a piston F slidably arranged in a cylinder G which may, if desired, be formed integrally with the cap or plate B. The piston may be actuated by fluid pressure supplied to the cylinder by any suitable automatic control device, (not shown). The piston may be of any suitable or desired construction, that shown being preferably provided with a leather cup $f$ to form a tight joint with the walls of the cylinder G. The lower end of the piston is provided with a projection or piston rod $f'$ which may be either loosely connected with the piston F as shown, or may be secured thereto or formed integrally therewith, as may be desired. This piston rod extends through a guide disk or bushing $f^2$ secured in the lower end of the cylinder G. The cylinder G shown is formed integrally with the valve cap B and the upper end thereof is closed by means of a cylinder head $g$ which is provided with an inlet opening $g'$ for the actuating fluid. When the valve is open the piston F occupies a position in the upper portion of the cylinder G and when the fluid under pressure is admitted into the cylinder G the piston F is forced downwardly causing the piston rod $f'$ which bears on the cam-faced portion $e^3$ of the toggle link E, to move the toggle mechanism from the position shown in Fig. 1 to the position shown in Fig. 2, in which position the valve is rigidly pressed against its seat.

By means of the mechanism described the valve C' will be subjected by the toggle link D to a downwardly acting pressure. In order to prevent this pressure from causing the valve guiding means to bind, the valve housing is preferably provided with an inwardly extending projection or bracket H which in the construction shown is formed integrally with the valve housing and has an upper face $h$ with which the lower edge of the valve C' is adapted to engage. Consequently the valve slides along the face $h$ of the bracket H which opposes any downwardly acting forces to which the valve C' is subjected and prevents the binding of the valve in its guide means.

Means are preferably provided whereby the valve may be closed by hand independently of the piston F. For this purpose in construction shown, the toggle link E is provided with an arm or extension I which extends into operative relation to a stem or rod K which may, if desired, be threaded and engages a correspondingly threaded hole in a boss $k$ formed on the valve housing A. The threaded rod K is provided with a hand wheel or disk $k'$ by means of which the rod may be turned. The inner end of the rod is provided with an enlarged head or part $k^2$ adapted to engage the end of the arm I of the toggle link E so that by turning the threaded rod K the same may be moved from the position shown in Fig. 1 to the position shown in Fig. 2, thus drawing the arm I into a position in which the toggle mechanism will close the valve. The end of the arm I is preferably bifurcated and straddles the threaded rod K. Any other means for closing the valve by hand may be provided, or if desired this hand operated device may be entirely omitted.

In the construction shown, the piston F and the threaded rod K only act on the toggle mechanism in one direction to wit, in a direction to close the valve, and consequently means are preferably provided for opening the valve when the pressure on the toggle mechanism by the piston F or the threaded rod K is relieved. For this purpose a spring L is provided which in the construction shown, extends under the toggle link E and the ends of which engage the opposite ends of the pivot member $e$ and the housing A. This spring acts so as to normally hold the toggle mechanism in the position shown in Fig. 1. If desired, this spring may be omitted, since the air pressure acting against the valve C' would of itself tend to open the valve when the pressure acting through the toggle mechanism is released.

The unloader valve described is particularly desirable for the reason that the toggle mechanism enables a relatively great force to be exerted upon the valve C' by means of a comparatively small force acting on the toggle mechanism. Consequently the piston F and the cylinder G may be made considerably smaller in diameter than would ordinarily be necessary with an unbalanced valve such as shown. The pressure exerted by the toggle mechanism on the valve also increases as the two links of the toggle mechanism approach a straight line position, which is particularly desirable, since this enables the valve to be pressed against its seat with a greater pressure than is usually obtainable. This is particularly desirable in suction unloaders since any leak of air through the unloader valve when the same is closed will cause heating of the compressor. The device also has the advantage of requiring a comparatively small amount of compressed air to actuate the unloader valve, which is an important feature, particularly in compressed air systems where a close regulation is desired, and where consequently the compressor is frequently loaded and unloaded. The valve described has a further advantage that it can be very tightly closed since a disk valve of the kind shown can be made to accurately fit its seat, and because of the pressure with which the valve is forced against its seat, and with a valve of this kind there is much less leakage than with balanced valves, in which an air tight closure is very difficult to obtain.

I claim as my invention:—

1. The combination of a valve housing having a valve seat, a valve in said housing and adapted to cooperate with said seat, a pair of toggle links connected with said valve and said housing, a cylinder on said housing, a plunger in said cylinder, and a cam interposed between said toggle links and said plunger whereby said plunger may move said valve toward its seat.

2. The combination of a valve housing having a valve seat, a valve in said housing and adapted to cooperate with said seat, a pair of toggle links connected with said valve and said housing, one of said links having an extension forming a cam, a cylinder on said housing, and a plunger in said cylinder and adapted to act on said cam to move said valve to its seat.

3. The combination of a valve housing having a valve seat, a valve in said housing and adapted to cooperate with said seat, a pair of toggle links connected with said valve and said housing, pressure actuated means for acting on said toggle links to close said valve, and means operable manually for closing said valve independently of said pressure actuated means.

4. The combination of a valve housing having a valve seat, a valve slidably arranged in said housing and movable toward and from said seat, a pair of pivotally connected toggle links, one of which is pivotally connected to said valve and the other of which is pivotally connected to said housing, one of said links having a cam portion adapted to extend into proximity to the pivotal connection between said links, and means adapted to engage said cam portion for moving said links to actuate said valve.

5. The combination of a valve housing having a valve seat, a valve slidably arranged in said housing and movable toward and from said seat, a pair of pivotally connected toggle links, one of which is pivotally connected to said valve and the other of which is pivotally connected to said housing, one of said links having a cam portion adapted to extend into proximity to the pivotal connection between said links, means adapted to engage said cam portion for actuating said links to move said valve in one direction, and a spring engaging one of said links and said housing for moving said valve in the other direction.

6. In an unloader valve for fluid compressors or the like the combination of a valve housing having a valve seat, a valve in said housing movable toward and from said seat, a cylinder secured to said valve housing, a piston in said cylinder, a toggle mechanism connected with said valve and actuated by said piston for operating said valve, and hand operated means operatively connected with said toggle mechanism for operating said valve, whereby said valve can be operated either by means of said piston or by hand.

7. The combination of a valve housing having a valve seat, a valve slidably arranged in said housing and movable toward and from said seat, a pair of pivotally connected toggle links within said housing, one of which is pivotally connected to said valve and the other of which is pivotally connected to said housing, an arm on one of said links and extending at an angle thereto within said housing, and means engaging said arm for actuating said toggle links to operate said valve.

8. The combination of a valve housing having a valve seat, a valve in said housing movable toward and from said seat, a cylinder secured to said valve housing, a piston in said cylinder, a toggle mechanism connected with said valve and actuated by said piston for operating said valve, one of the links of the toggle mechanism having an arm extending outwardly therefrom, and hand operated means operatively connected with said arm for actuating said valve, whereby said valve can be operated either by said piston or by hand.

9. In an unloader valve for fluid compressors and the like the combination of a valve housing having a valve seat, a valve slidably arranged in said housing and movable toward and from said seat, a pair of pivotally connected toggle links, one of which is pivotally connected to said valve and the other of which is pivotally connected to said housing at a part thereof opposite to said valve seat, a cylinder arranged on said valve housing, a piston in said cylinder which is operatively connected with said links to actuate the same for moving said valve, and a connection for admitting fluid under pressure to the end of said piston opposite said toggle links.

10. The combination of a valve housing having a valve seat, a valve in said housing slidable toward and from said seat, toggle mechanism connecting said valve and said housing, means at one side of said housing for exerting pressure on said toggle mechanism to close said valve, and a guide bearing on said valve housing at the side thereof opposite to said pressure exerting means for resisting the lateral pressure to which said valve is subjected by said toggle mechanism.

11. The combination of a valve housing having a valve seat, a valve slidably arranged in said housing and movable toward and from said seat, a pair of pivotally connected toggle links, one of which is pivotally connected to said valve and the other of which is pivotally connected to said housing, one of said links having a cam portion in proximity to the pivotal connection between said links, a cylinder secured to said housing, and a piston movable in said cylinder and engaging the cam portion of said link for actuating said valve.

12. The combination of a valve housing having inlet and outlet openings and an open head, a removable cap for closing said open head, a valve seat in said housing, a valve movable toward and from said valve seat, a cylinder in said cap, a piston movable in said cylinder, a connection for admitting fluid under pressure to said cylinder, connections between said piston and said valve, whereby said valve is operated by said piston, a manually operable member extending out of said housing, and connections between said member and said valve whereby the valve may be actuated by hand.

Witness my hand this 8th day of July, 1920.

GEORGE M. RICHARDS.

Witnesses:
E. P. MARSDEN,
JACOB J. MIDLEHOFEY.